(12) United States Patent
Wagner

(10) Patent No.: US 6,270,735 B2
(45) Date of Patent: ***Aug. 7, 2001

(54) APPARATUS FOR THERMAL STRIPPING AND MOLECULAR DECOMPOSITION FOR WASTE STREAMS

(75) Inventor: Anthony S. Wagner, Bee Caves, TX (US)

(73) Assignee: Clean Technologies International Corporation, Lakeway, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/136,077

(22) Filed: Aug. 18, 1998

(51) Int. Cl.[7] .......................................................... B61J 8/10
(52) U.S. Cl. ........................... 422/232; 422/210; 202/117; 202/118
(58) Field of Search ................................... 422/210, 232, 422/137, 224, 233; 202/117, 118; 198/665, 660, 668; 110/257, 255

(56) References Cited

U.S. PATENT DOCUMENTS

| | | | |
|---|---|---|---|
| 349,155 | * | 7/1886 | Gowans ................................ 198/665 |
| 1,071,371 | * | 8/1913 | Tyson . | |
| 3,279,895 | * | 10/1966 | Howe . | |
| 4,618,478 | * | 10/1986 | McKinney ............................ 422/198 |
| 4,983,278 | * | 1/1991 | Cha et al. ............................. 208/407 |
| 5,362,468 | | 11/1994 | Coulon et al. . | |
| 5,424,042 | | 6/1995 | Mason et al. . | |
| 5,464,503 | * | 11/1995 | Avetisian et al. ......................... 201/3 |
| 5,536,114 | | 7/1996 | Wetmore et al. . | |
| 5,710,360 | | 1/1998 | Self et al. . | |

* cited by examiner

*Primary Examiner*—Shrive Beck
*Assistant Examiner*—Alexa Doroshenk
(74) *Attorney, Agent, or Firm*—Russell D. Culbertson; Shaffer & Culbertson, LLP

(57) ABSTRACT

An apparatus removes water and organic compounds from waste streams such as contaminated soils and refinery tailings by a combination of thermal stripping and molecular decomposition. The apparatus includes at least one unit having a pipe which is preferably heated by induction heating and also having a transport arrangement. The transport arrangement includes a suitable motor and operates to move the waste stream material through the pipe and mix the material to provide uniform heat transfer from the heated pipe. The transport arrangement preferably includes an adjustment mechanism which allows adjustment of the rate at which material moves through the pipe for a given motor speed. The adjustment mechanism also adjusts the mixing provided by the transport arrangement. Several of the treatment units according to the invention may be connected in series to form a multistage device. The initial stages may be operated at temperatures capable of thermally stripping water and light hydrocarbons from the waste stream while the later units may be operated at temperatures to cause remaining organic material to decompose.

12 Claims, 5 Drawing Sheets

APPARATUS FOR THERMAL STRIPPING AND MOLECULAR DECOMPOSITION FOR WASTE STREAMS

TECHNICAL FIELD OF THE INVENTION

The invention relates to the recovery or removal of organic compounds from soil, refinery tailings, and the like. The invention is particularly suited for removing light oils, pesticides, heavy oils or tar and/or other hazardous chemicals from soil which has been contaminated with such chemicals.

BACKGROUND OF THE INVENTION

Soils which have become contaminated with various organic compounds such as oils or pesticides, for example, must be treated to remove the contaminating material in order to prevent the contaminating material from leaching into adjacent areas and ground water. Certain refinery tailings may also contain harmful organic compounds with must be removed before the tailings can be landfilled or otherwise released to the environment.

Organic compounds may be removed from contaminated soil and certain refinery tailings and the like by subjecting the contaminated material to heat. This heat treatment for removing organic compounds is commonly referred to as "thermal stripping." Relatively low temperatures cause light oils and other hydrocarbon contaminants to go into a gaseous phase in which the contaminant releases from the contaminated material. Heavier oils may be driven out of the contaminated material in a gaseous phase at higher treatment temperatures. Even higher temperatures may be used to break chemical bonds in organic compounds such as pesticides, and allow the constituent elements or chemicals to release from the contaminated material. While it has been known to remove organic compounds from contaminated soil and the like through thermal stripping, prior thermal stripping processes have not provided sufficient control to accommodate the many different types of contaminants which may be present in the contaminated soil.

SUMMARY OF THE INVENTION

It is an object of the invention to provide an apparatus and method for removing organic compounds from soil, refinery tailings, and other similar waste streams. More particularly, it is an object of the invention to provide an apparatus and method which facilitates a high degree of control in the removal of organic contaminants from waste streams such as contaminated soils.

An apparatus embodying the principles of the invention is made up of one or more units, the number of units depending upon the types of contaminants to be removed from the particular waste stream. Each unit comprises a heated pipe having an inlet end and an outlet end. The pipe is heated preferably by electrical induction heating and transfers heat to the waste stream contained therein. A transport unit is mounted inside the heated pipe for transporting the waste stream there through and mixing the waste stream to provide uniform heating in the material. According to the invention, the transport unit is adjustable so that the rate at which the waste stream passes through the pipe may be closely controlled without eliminating the mixing action produced by the transport unit.

The transport unit comprises a dual line of substantially semi-circular transport segments pivotally mounted on opposite sides of a hollow mounting cylinder. The mounting cylinder itself is concentrically mounted within the heated pipe for rotation about its longitudinal axis. A drive unit is associated with the mounting cylinder for rotating the mounting cylinder about its longitudinal axis. The uppermost end of a pivotal mounting rod for each segment is connected to a spring-loaded scraper blade for scraping the inner wall of the pipe to help mix the material passing through the pipe and prevent buildup on the pipe walls which could reduce heat transfer to the waste stream. The lower end of each mounting rod extends through a bearing into the hollow mounting cylinder and is operatively connected by a lever arm to a threaded rod that extends through the mounting cylinder. The lever arm and threaded adjusting rod cooperate to adjust the angle of each row of transport segments. For maximum transport at a particular speed setting of the drive for the transport unit, the angle of each row of segments is set equal and opposite with the leading edge of one row of segments being approximately above the trailing edge of the opposite row of segments. At any one speed, decreasing the angle of each row of segments with respect to a line perpendicular to the mounting cylinder will give more mixing and slower transport.

One unit according to the invention may be used for treating a waste stream to remove water and low-boiling point organic compounds by thermal stripping. A plurality of units according to the invention may be used in series to remove contaminants by both thermal decomposition and thermal stripping. For example, three units may be used in series to treat a waste stream comprising a contaminated soil including water, low-boiling organic compounds, high-boiling organic compounds, and normally solid compounds such as pesticides and insecticides. The first unit in the series may be operated with the exit temperature held at about 100 degrees centigrade. Water vapor and organic compounds released in the first unit are preferably vented to a suitable condenser to condense the water vapor and organic compounds.

The solids from the outlet of the first unit feeds into the second unit. The second unit is equipped with a vent line leading to a condenser to condense the higher-boiling organic compounds for recycle and the exit temperature may be held at 200 to 300 degrees centigrade. The solid material discharged from the second unit feeds into the inlet end of the third unit. The exit temperature of the third unit may be held at 750 to 950 degrees centigrade to crack organic compounds remaining in the waste stream. The third unit in the series is equipped with a vent line and a suitable scrubber for removing elements such as chlorine and bromine from the vent gases.

The process control achieved with the invention makes the present treatment apparatus and method suitable for treating soils and the like contaminated with many different types of organic contaminants. In waste streams containing only light organic contaminants or organic contaminants plus water, the apparatus provides thermal stripping to produce a landfillable solids output while separating the water and lower boiling point organics. The apparatus according to the invention may also decompose organics such as insecticides, and remove the resulting constituent elements or compounds. In waste streams containing organic contaminants plus metals that must be removed before the solids may be placed in a landfill, the apparatus according to the invention can be used as a pretreatment before metal removal. This pretreatment may be particularly useful where metal removal is to be accomplished by leaching or by molten metal contact as outlined in U.S. Pat. No. 5,000,101.

These and other objects, advantages, and features of the invention will be apparent from the following description of the preferred embodiments, considered along with the accompanying drawings.

DESCRIPTION OF THE PREFERRED EMBODIMENTS

Figure 1:
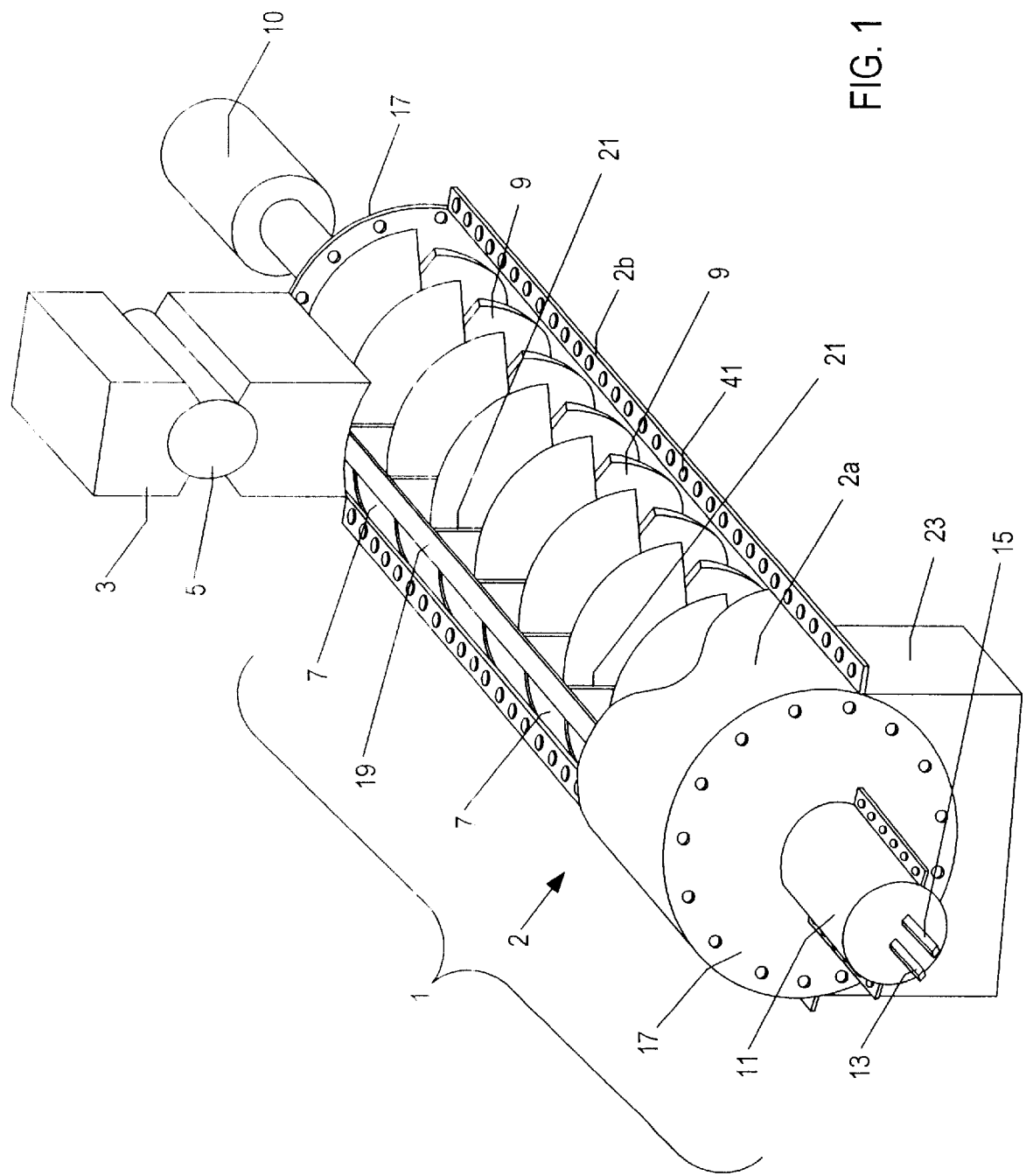
FIG. 1 is a view in perspective of a single unit embodying the principles of the invention with a portion of the pipe removed to show the transport unit.

FIG. 1 shows a single unit 1 embodying the principles of the invention. The unit 1 includes a heated pipe 2 having a generally cylindrical inner surface and comprising a top half 2a and a bottom half 2b. The top half 2a of the heated pipe 2 is shown broken away in FIG. 1 to show a transport unit within the pipe. The heating arrangement is also omitted from FIG. 1. The top half 2a in this illustrated form of the invention is secured to the bottom half 2b by a suitable longitudinal flange. Those skilled in the art will appreciate that the pipe may be a unitary piece rather than the flanged top and bottom halves described with reference to FIG. 1. Although the single unit 1 may be used both for thermal stripping and molecular decomposition, a single unit according to the invention is best used where thermal stripping alone is desired.

Figure 5:
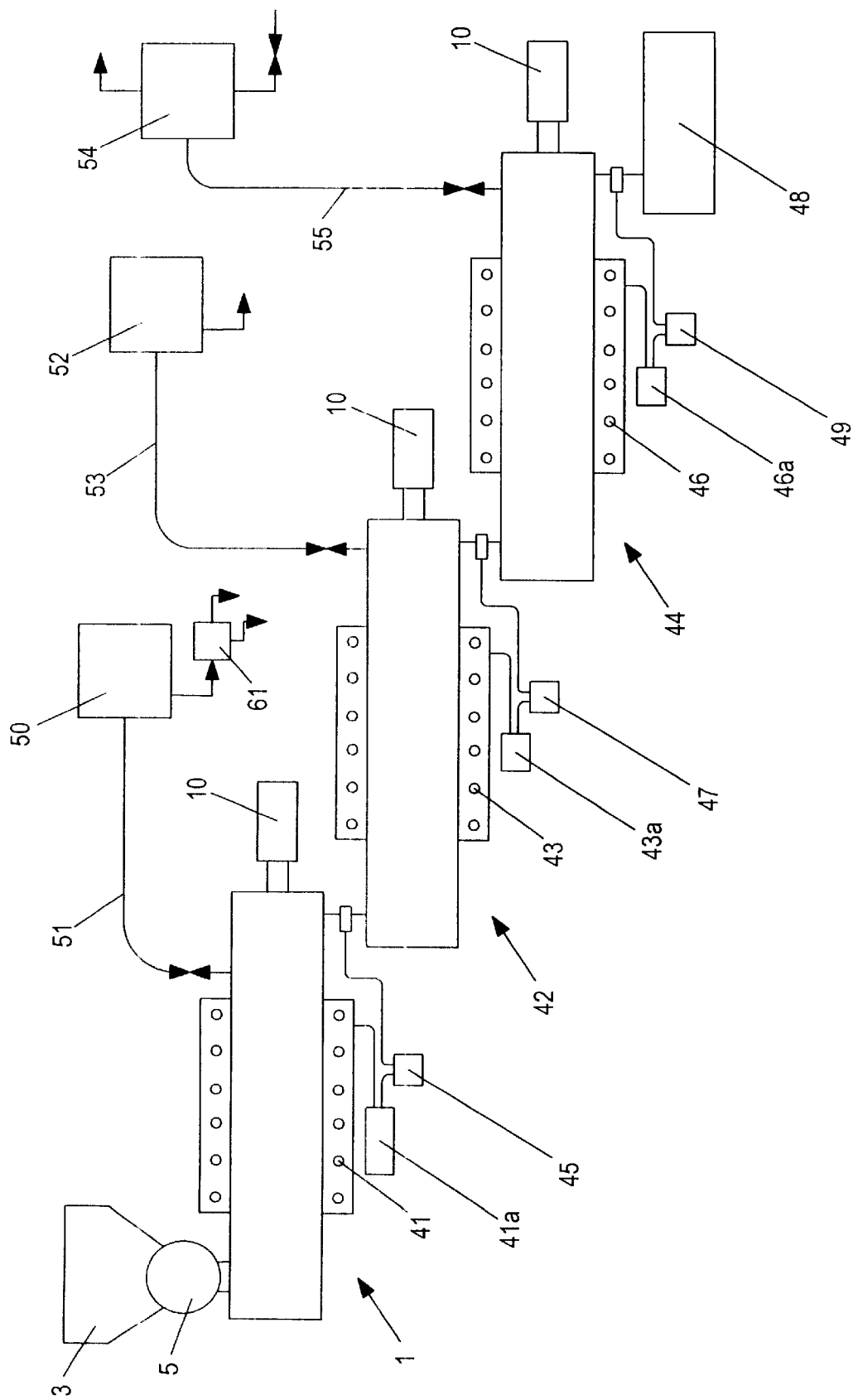
FIG. 5 is a diagrammatic representation of a multistage thermal stripping arrangement embodying the principles of the invention.

As shown in FIG. 1, the pipe is sealed at each end with a flange 17. Feed chute 3 may be used to feed material to be treated through a star feeder 5 into the pipe. The star feeder 5 helps reduce the amount of air entering the pipe 2. Solids exit the unit 1 through discharge chute 23 which may empty into any of several types of containers or as shown in FIG. 5 may discharge into a similar unit for further treatment. Discharge chute 23 includes a suitable arrangement for preventing air from entering the pipe. Although not shown in FIG. 1, each unit preferably also includes a suitable purging system for purging the pipe 2 of air prior to operation. A suitable purge system may use an inert gas such as Nitrogen to displace air from the pipe. Removing air from the pipe is necessary to prevent the organic materials being released in the pipe 2 from oxidizing.

The transport unit housed within the pipe transports material there through and mixes the material within the pipe. The transport unit includes a mounting cylinder 11 having multiple, pivotally mounted transport segments 9. Mounting cylinder 11 is concentrically mounted within the pipe for rotation about its longitudinal axis, driven by variable speed drive motor and gearing arrangement 10. Each transport segment 9 is connected to a pivot mount rod 21, and the pivot mount rods are each pivotally connected on a lower end, as shown in more detail in FIG. 4, to the mounting cylinder 11. Each pivot mount rod 21 is pivotally connected at its upper end to scraper 19, as also shown in more detail in FIG. 4.

Referring to FIG. 1, multiple transport segments 7 are connected to mounting cylinder 11 in the same way as segments 9. To obtain maximum transport and minimum mixing at a given speed of motor 10, segments 7 and 9 are adjusted to maximum equal and opposite angles relative to a plane perpendicular to the mounting cylinder 11. At a given angle of the transport segments 7 and 9, the rate at which material is conveyed through the pipe and the amount of mixing within the pipe is controlled by the speed of the motor and gearing arrangement 10. The angle of each transport segment 7 and 9 is adjustment through fittings 13 and 15 as shown in more detail in FIG. 3. The motor speed, transport segment angles, and heat of the pipe are preferably automatically controlled to control thermal stripping and molecular decomposition within the unit. The control equipment is omitted from the drawings to avoid obscuring the invention in unnecessary detail. Such control systems themselves are in any event well within the knowledge of those skilled in the art.

Each unit also includes a suitable heating arrangement for heating the pipe to a desired temperature for transferring heat to the material being transported through the pipe. The invention preferably employs a suitable induction heating arrangement shown in FIG. 5 for heating the pipe, although the invention is not limited to induction heating. Referring to the fist unit 1 shown in FIG. 5, the preferred induction heater includes a suitable induction coil or coils 41 positioned adjacent to the pipe 2 and an induction heating control unit 41a. The preferred induction heating arrangement heats the pipe by inducing alternating electromagnetic fields in the metal from which the pipe is constructed. The electromagnetic fields produce eddy currents within the pipe material itself, thereby heating the pipe material internally.

Figure 2:
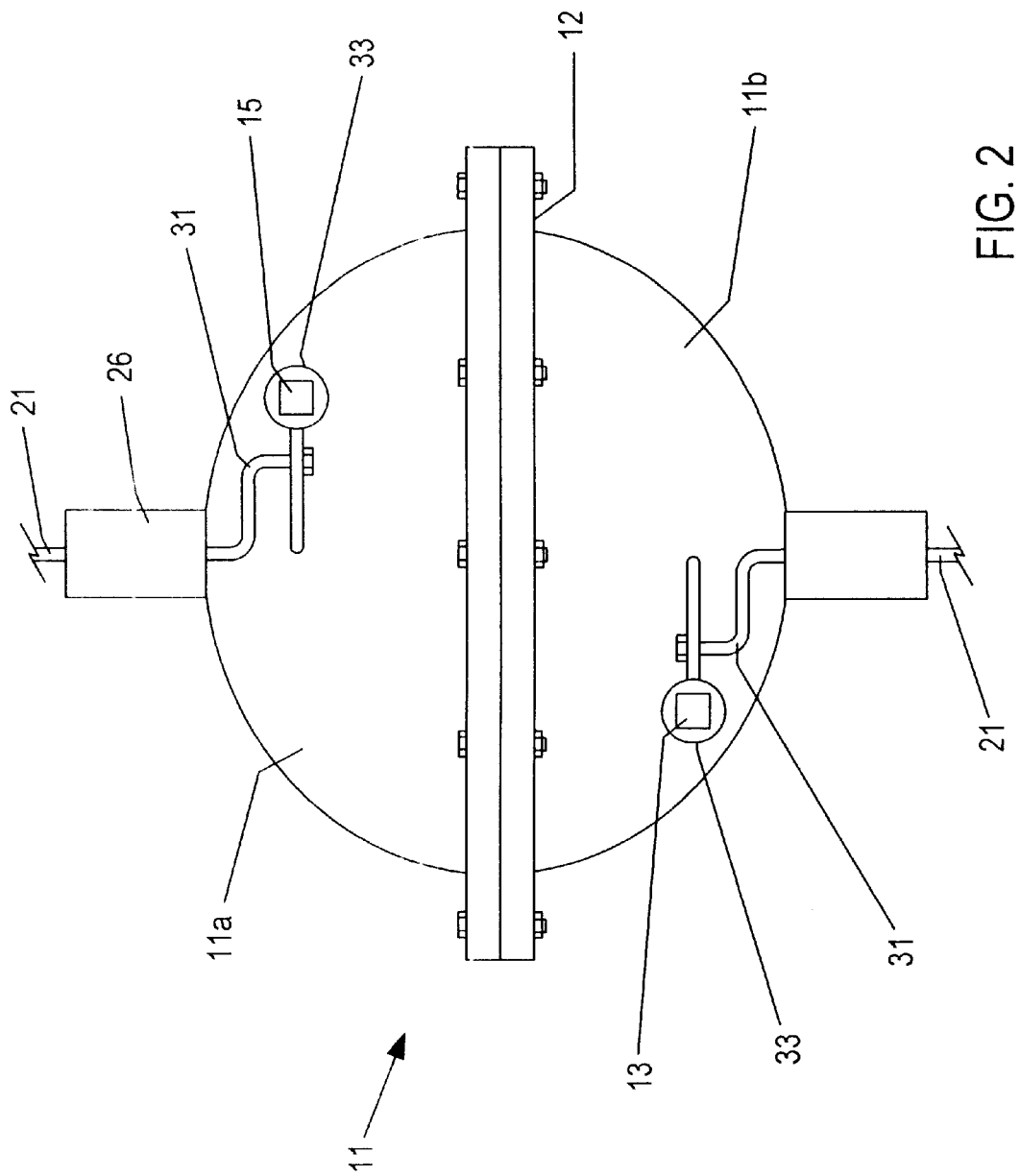
FIG. 2 is an end view of a portion of the transport unit.
Figure 3:
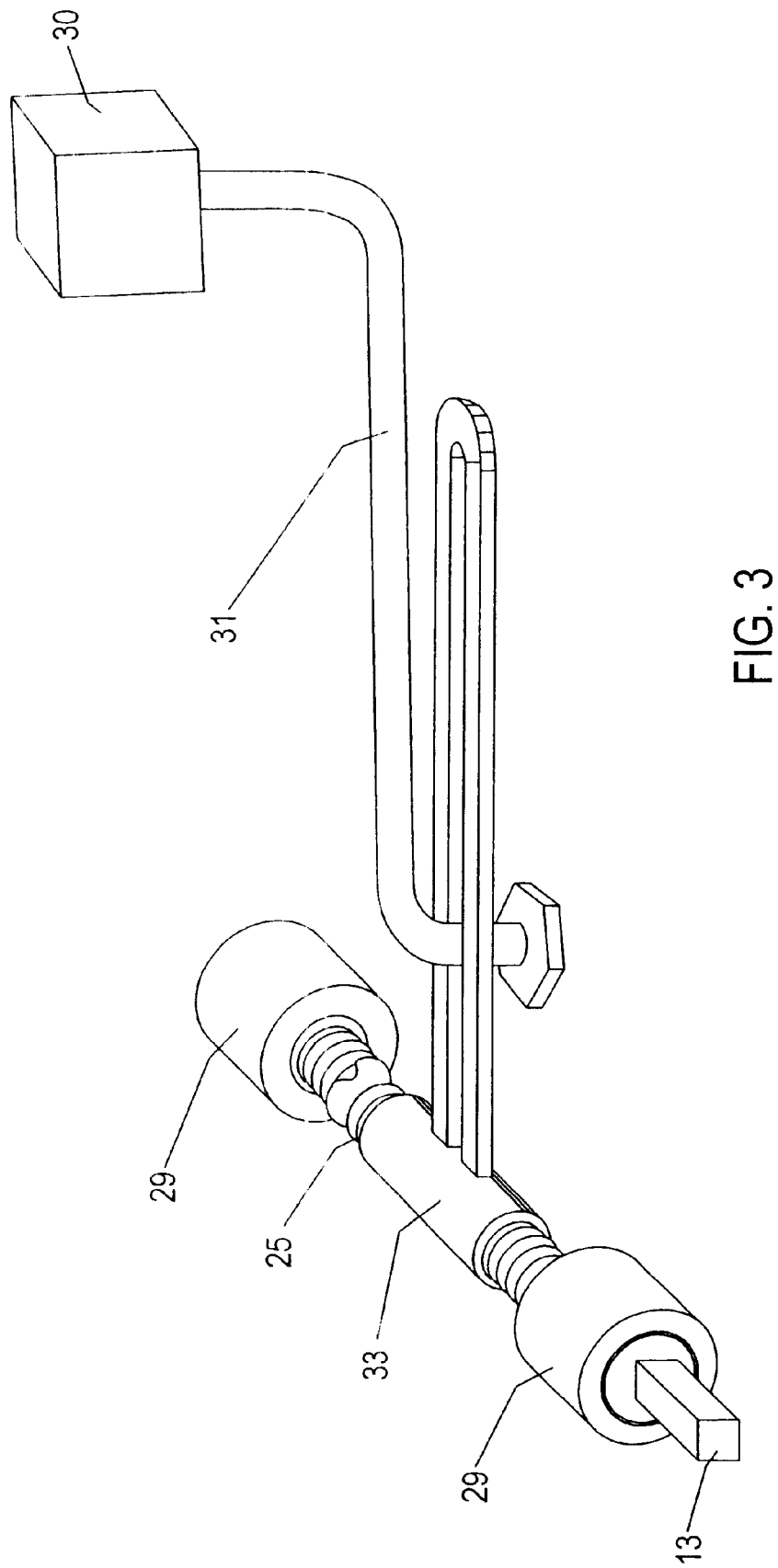
FIG. 3 is an view in perspective showing the lever arm adjustment mechanism for the transport unit.

FIG. 2 shows an end view of mounting cylinder 11 which is preferably formed from two cylinder halves 11a and 11b connected together by suitable means such as flange 12. Lever arms 31 are connected to mounting rods 21 of segments 7 and 9 in bearing holders 26 as shown in more detail in FIG. 4. Referring to FIGS. 2 and 3, lever arm adjustment fittings 33 are threaded on an adjustment rod 25 shown in FIG. 3 so that rotation of the adjustment rod 25 about its longitudinal axis moves the lever arm 31 associated with each transport segment 7 and 9 and adjusts the angle of the respective transport segment. Adjustment connector 13 is provided at the end of the adjustment rod 25 associated with transport segments 7 by which the rod may be rotated to adjust the angle of all segments 7. Adjustment connector 15 is provided at the end of the adjustment rod 25 associated with transport segments 9 by which the rod may be rotated to adjust the angle of all segments 9.

Figure 4:
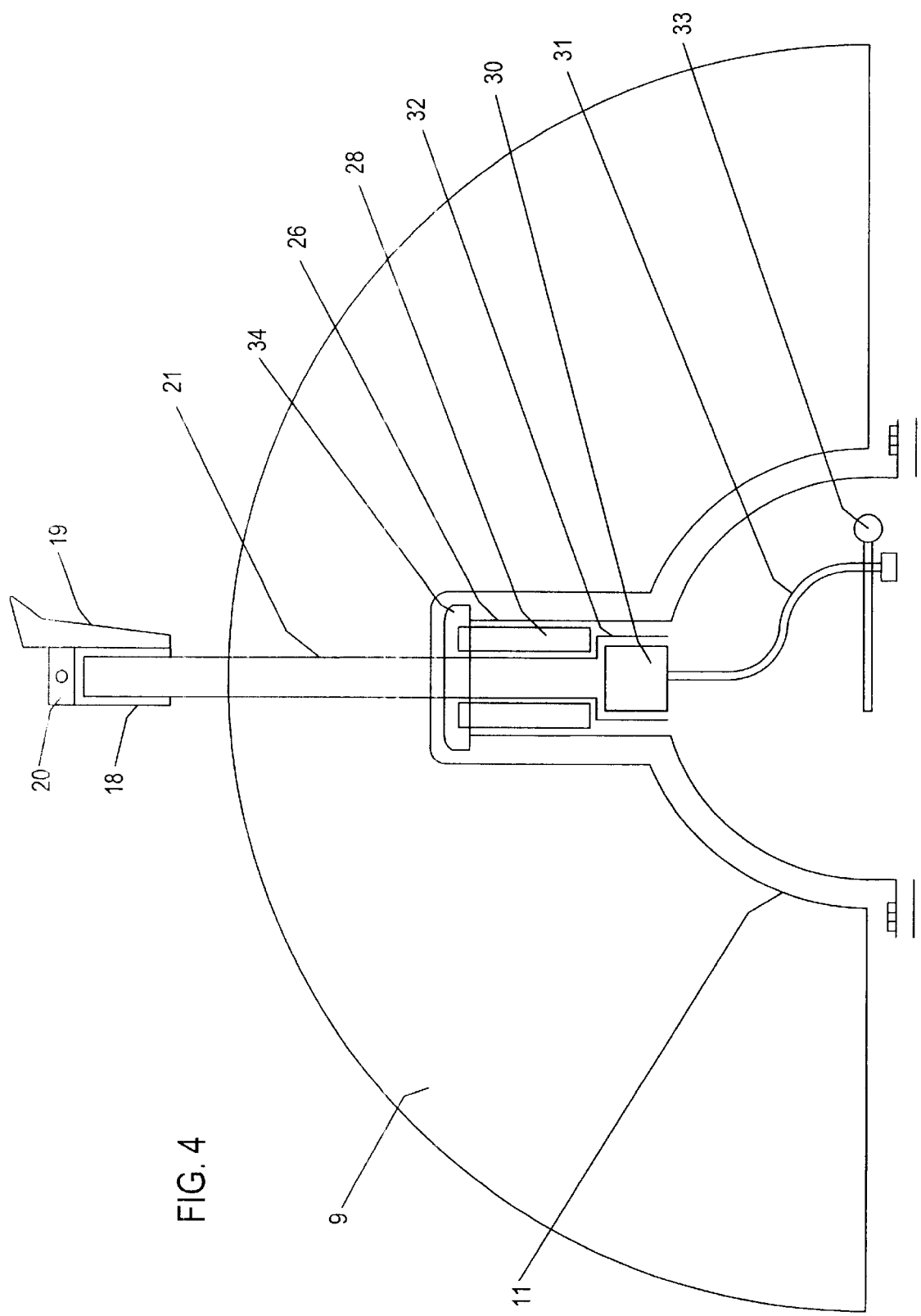
FIG. 4 is a somewhat diagrammatic end view of a portion of the transport unit.

FIG. 3 illustrates the interaction of lever arm 31 with adjustment fitting 33 which is threadably connected with threaded adjustment rod 25. Threaded adjustment rod 25 is held at both ends in a suitable bearing 29 mounted at the ends of the mounting cylinder 11. Rotating adjustment connector 13 rotates rod 25 and produces an axial displacement of the adjustment fitting 33 along the rod 25 which in turn moves lever arm 31 through the slotted arm of fitting 33. This movement of lever arm 31 rotates male fitting 30. As shown in FIG. 4, the rotation of male fitting 30 also rotates female fitting 32 which is rigidly connected with segment mounting rod 21.

As shown in FIG. 1, scraper 19 extends the full length of the pipe 2. Referring to FIG. 4, scraper 19 connects to all mounting rods 21 of segments 9 with fitting 18. Spring 20 serves to press scraper 19 against the inner wall of the pipe. A second scraper 19 is similarly connected to the mounting rods 21 associated with all segments 7 and functions similarly. Mounting rod 21 is supported in sleeve bearing 28 which is held in bearing holder 26. Bearing holder 26 is rigidly connected to mounting cylinder 11 and is closed with cap 34 that fits closely around rod 21 for form a substantial seal.

FIG. 5 shows a multistage embodiment of the invention, including units 1, 42, and 44. Units 42 and 44 are essentially the same as the single unit 1 described primarily in connection with FIGS. 1 through 4. However, unit 42 may not require the star feeder and air blocking outlet chute, and unit 44 may not require the star feeder. This multistage unit is well suited for waste streams that may have water, recoverable liquid organic compounds, and hazardous solid organic compounds. Each stage of the multistage unit may be individually temperature controlled to remove a different types of materials from the waste stream.

Consider the decontamination of a waste stream comprising soil containing water and contaminated with, oils or other liquid hydrocarbons, and a solid pesticide. According to the invention, the waste stream is fed to the first stage, unit 1, through chute 3 and star feeder valve 5 associated with the unit. The temperature sensor-controller 45 may be set to a first thermal stripping temperature of about 105 degrees centigrade, controlling induction heater coils 41 to maintain this temperature. An instrument control system, not shown, controls the speed of motor 10 and the speed of star feeder valve 5 to maintain the desired 105 degree centigrade outlet temperature for unit 1. As shown in FIGS. 1 through 4, the angle of segments 7 and 9 (FIG. 1) may be adjusted to achieve more mixing and better heat transfer from the hot wall of unit 1 to the waste stream. In this example, all water and some oil in the waste stream goes to a gaseous phase and exits unit 1 through vent line 51 to condenser 50. The liquid condensate from condenser 50 may be separated in a suitable separator 61 into water and oil output streams.

The multistage unit directs the waste stream exiting unit 1 to the inlet of second stage unit 42. Although the material may be moved into the second stage unit 42 by any suitable means, the waste stream is preferably gravity fed into the second stage unit 42. Temperature sensor-controller 47 associated with second stage unit 42 may be set to control induction coils 43 through induction unit 43a to maintain the temperature at the outlet end of the second stage unit at a second thermal stripping temperature of approximately 250 to 350 degrees centigrade. At these temperatures heavier oils or other hydrocarbons go into a gaseous phase and exit the pipe associated with second stage unit 42 through vent line 53. The exiting hydrocarbons are then condensed in condenser 52 to form another outlet stream from the multistage unit.

The waste stream exiting second stage unit 42 is directed to the inlet of third stage unit 44, again preferably by gravity feed. At this point the waste stream includes the soil, the contaminating pesticides, and perhaps other solid organic compounds. Sensor-controller 49 is set to control the induction unit 46a and coils 46 to maintain the temperature at the outlet end of the third stage unit 44 at a decomposition temperature. This temperature may be at approximately 850 degrees centigrade or some other temperature to cause the remaining organic materials, and particularly the contaminating pesticide, to decompose into constituent compounds or elements. These compounds or elements go to a gaseous phase at the desired treatment temperature and exit third stage unit 44 through vent line 55. A suitable scrubber 54, such as an alkaline scrubber, may be used to remove ions such as chlorine and bromine before venting to the atmosphere or to further processing apparatus. The solid material exiting the outlet end of third stage unit 44 comprises mostly soil and is directed to an outlet container 48. This solid material may be landfilled or disposed of in some other suitable manner.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A thermal stripping and molecular decomposition unit including:
   (a) a unit body having a substantially cylindrical cavity;
   (b) an elongated mounting cylinder positioned coaxially within the cavity of the unit body for rotation about the longitudinal axis of the cavity, the mounting cylinder including a central opening extending longitudinally there through;
   (c) a plurality of mounting rods spaced apart along the length of the mounting cylinder, each mounting rod extending generally radially from the mounting cylinder and being connected to the mourning cylinder for rotation about its respective longitudinal axis;
   (d) each mounting rod having a substantially planar transport segment rigidly connected thereto in an annular area between the mounting cylinder and an inner wall of the unit body cavity;
   (e) an adjustment arrangement located within the mounting cylinder for adjusting the angle of the segments with respect to the longitudinal axis of the unit body cavity;
   (f) a scraper separate from the transport segments and connected to a distal end of at least two mounting rods in a position radially outward of the transport segments associated with the respective mounting rods, the scraper having an edge lying adjacent to the inner wall of the unit body cavity; and
   (g) a heater for heating material contained within the cylindrical cavity of the unit body.

2. The thermal stripping and molecular decomposition unit of claim 1 wherein:
   (a) the mounting rods are arranged in pairs spaced apart along the length of the mounting cylinder, each pair of mounting rods including a first mounting rod extending from one side of the mounting cylinder, and a second mounting rod extending from the opposite side of the mounting cylinder.

3. The thermal stripping and molecular decomposition unit of claim 1 further comprising:
   (a) a vent line from the cavity of the unit body; and
   (b) a condenser connected to the vent line for condensing compounds from gases exiting the cavity of the unit body through the vent line.

4. The thermal stripping and molecular decomposition unit of claim 1 wherein the adjustment arrangement comprises:
   (a) mounting rod control means for simultaneously rotating the mounting rods extending from one side of the mounting cylinder each about their respective longitudinal axis and fixing said mounting rods in a particular angular orientation.

5. A thermal stripping and molecular decomposition unit including:
   (a) a unit body having a substantially cylindrical cavity;
   (b) a transport unit mounted within the unit body cavity and having mounted thereon a plurality of substantially planar transport segments, the transport unit for transporting material from an inlet end to an outlet end of the unit body cavity, and for mixing the material contained in the unit body cavity;

(c) an adjustment arrangement, including an adjustment rod extending along a longitudinal axis substantially parallel to the longitudinal axis of the unit body cavity, the adjustment rod being mounted for rotation about its longitudinal axis within the transport unit and having a portion positioned outside of the unit body cavity, the adjustment arrangement enabling an input applied outside of the unit body cavity to adjust the angle of the transport segments with respect to the longitudinal axis of the unit body cavity;

(d) a mechanical linkage between the adjustment rod and at least a portion of the transport segments enabling the angle of the portion of transport segments to be adjusted by rotating the adjustment rod about its longitudinal axis; and (e) a heater for heating material contained within the cylindrical cavity of the unit body.

6. The thermal stripping and molecular decomposition unit of claim 5 wherein the transport unit includes:

(a) an elongated mounting cylinder positioned coaxially within the cavity of the unit body for rotation about the longitudinal axis of the cavity, the mounting cylinder including a central opening extending longitudinally there through;

(b) a plurality of mounting rods spaced apart along the length of the mounting cylinder, each mounting rod extending generally radially from the mounting cylinder and being connected to the mounting cylinder for rotation about its respective longitudinal axis; and (c) each mounting rod having one of the transport segments rigidly connected thereto in an annular area between the mounting cylinder and the inner wall of the unit body cavity.

7. The thermal stripping and molecular decomposition unit of claim 5 further comprising:

(a) a vent line from the cavity of the unit body; and (b) a condenser connected to the vent line for condensing compounds from gases exiting the cavity of the unit body through the vent line.

8. The thermal stripping and molecular decomposition unit of claim 5 further comprising:

(a) a scraper connected in a position radially outward of the transport segments with respect to the longitudinal axis of the unit body cavity, the scraper having an edge lying adjacent to the inner wall of the unit body cavity.

9. A thermal stripping and molecular decomposition unit including:

(a) a unit body having a substantially cylindrical cavity;

(b) a transport unit mounted within the unit body cavity and having mounted thereon a plurality of substantially planar transport segments, the transport unit for transporting material from an inlet end to an outlet end of the unit body cavity, and for mixing the material contained in the unit body cavity;

(c) an adjustment arrangement for adjusting the angle of the transport segments with respect to the longitudinal axis of the unit body cavity;

(d) a scraper separate from the transport segments and connected in a position radially outward of the transport segments with respect to the longitudinal axis of the unit body cavity, the scraper having an edge lying adjacent to the inner wall of the unit body cavity; and (e) a heater for heating material contained within the cylindrical cavity of the unit body.

10. The thermal stripping and molecular decomposition unit of claim 9 wherein the transport unit includes:

(a) an elongated mounting cylinder positioned coaxially within the cavity of the unit body for rotation about the longitudinal axis of the cavity, the mounting cylinder including a central opening extending longitudinally there through;

(b) a plurality of mounting rods spaced apart along the length of the mounting cylinder, each mounting rod extending generally radially from the mounting cylinder and being connected to the mounting cylinder for rotation about its respective longitudinal axis; and (c) each mounting rod having one of the transport segments rigidly connected thereto in an annular area between the mounting cylinder and the inner wall of the unit body cavity.

11. The thermal stripping and molecular decomposition unit of claim 10 wherein:

(a) the mounting rods are arranged in pairs spaced apart along the length of the mounting cylinder, each pair of mounting rods including a first mounting rod extending from one side of the mounting cylinder, and a second mounting rod extending from the opposite side of the mounting cylinder.

12. The thermal stripping and molecular decomposition unit of claim 11 wherein:

(a) a first scraper is connected to a distal end of each mounting rod extending from one side of the mounting cylinder and a second scraper is connected to a distal end of each mounting rod extending from the opposite side of the mounting cylinder, each scraper having an edge positioned adjacent to the inner wall of the unit body cavity.

* * * * *